United States Patent
Farmer et al.

(10) Patent No.: US 6,651,621 B2
(45) Date of Patent: Nov. 25, 2003

(54) THROTTLE VALVE POSITION DETERMINATION USING ACCELERATOR PEDAL POSITION

(75) Inventors: David George Farmer, Plymouth, MI (US); David Oshinsky, Trenton, MI (US); Stanley Larue Bower, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 10/004,036

(22) Filed: Dec. 6, 2001

(65) Prior Publication Data

US 2003/0106527 A1 Jun. 12, 2003

(51) Int. Cl.$^7$ ................................................ F02D 1/00
(52) U.S. Cl. .......................... 123/396; 123/399; 73/116
(58) Field of Search ................... 123/361, 399, 123/396; 73/116, 118.1

(56) References Cited

U.S. PATENT DOCUMENTS

| | | | |
|---|---|---|---|
| 4,359,894 A | 11/1982 | Ikeura et al. | 73/118 |
| 4,515,009 A | 5/1985 | Hasegawa et al. | 73/118 |
| 4,581,924 A | 4/1986 | Otobe et al. | 73/118 |
| 4,586,403 A | 5/1986 | Lee et al. | 74/866 |
| 4,660,520 A | 4/1987 | Inoue et al. | 123/399 |
| 4,951,206 A | 8/1990 | Kyohzuka | 364/424.1 |
| 5,213,078 A | 5/1993 | Kolberg et al. | 123/399 |
| 5,318,000 A * | 6/1994 | Binnewies et al. | 123/399 |
| 5,529,296 A * | 6/1996 | Kato et al. | 267/155 |
| 5,578,749 A | 11/1996 | Mogaki | 73/118.1 |
| 5,626,534 A * | 5/1997 | Ashley et al. | 477/79 |
| 5,738,609 A * | 4/1998 | Jones et al. | 477/175 |
| 6,078,860 A * | 6/2000 | Kerns | 701/93 |
| 6,199,535 B1 * | 3/2001 | Hara | 123/396 |
| 6,223,717 B1 * | 5/2001 | Wiemers | 123/295 |
| 6,295,967 B1 * | 10/2001 | Weber et al. | 123/399 |
| 6,565,482 B2 * | 5/2003 | Kobayashi et al. | 477/174 |

* cited by examiner

Primary Examiner—John Kwon
(74) Attorney, Agent, or Firm—John F. Buckert; Allan J. Lippa

(57) ABSTRACT

A closed throttle position of a vehicle internal combustion engine is determined by storing a plurality of signal values representative of previous foot-off position values of an accelerator pedal (10) within a normal range of pedal positions, determining a current foot-off position value of the accelerator pedal, comparing the current foot-off position value to an average of the previous stored foot-off position values, and using the average as the closed pedal position to determine a closed throttle position when the comparison is indicative of an abnormal pedal position.

22 Claims, 5 Drawing Sheets

THROTTLE VALVE POSITION DETERMINATION USING ACCELERATOR PEDAL POSITION

BACKGROUND OF THE INVENTION

1. Field of the Invention

The present invention relates to a determination of the closed position of a throttle valve of a vehicle internal combustion engine using accelerator pedal position information.

2. Description of Related Art

Certain vehicle internal combustion engines equipped with an electronic throttle body rely on a powertrain control system (PCS) to process the vehicle driver's demanded accelerator pedal position as one of several inputs to demand and control power from the engine by control of airflow through the throttle body. The PCS calculates the driver demand by taking the difference between the current accelerator pedal position and a closed accelerator pedal position corresponding to a closed throttle valve that in turn corresponds to an engine idling condition.

An incorrect determination of a foot-off accelerator pedal position (i.e. forcing an incorrect throttle valve position) thus can result in the PCS's commanding an incorrect airflow. For example, an incorrect determination of the closed throttle valve position can occur when the accelerator pedal snaps back after the driver abruptly removes his foot; for example, when the driver's foot slips off pedal. In this situation, the accelerator pedal returns temporarily to an abnormal pedal position outside the expected normal range of foot-off pedal positions such that a determination of such a "snap-back" pedal position will result in an incorrect airflow control command by the PCS. In addition, incorrect determination can occur when a reverse load is applied to the accelerator pedal when, for example, the driver's foot pulls upwardly on the front of the pedal such that the pedal is temporarily at an "pull-back" pedal position outside the expected normal foot-off pedal position range. A determination of such an abnormal "pull-back" pedal position in this situation also will result in an incorrect airflow control command by the PCS.

SUMMARY OF THE INVENTION

The present invention provides pursuant to one embodiment a method and control system for determining a closed throttle position of a vehicle internal combustion engine using signal values representative of a foot-off position of an accelerator pedal. The invention involves storing a plurality of signal values representative of previous foot-off positions of the accelerator pedal typical of a normal range of pedal positions, determining an average of these signal values, determining a current foot-off position value of the accelerator pedal, comparing the current foot-off pedal position value and the average, and using the average to determine a closed throttle position when the comparison is indicative of an abnormal pedal position.

In another embodiment of the invention, the current foot-off pedal position value is determined after a predetermined period of time after the pedal has moved to a foot-off pedal position, the time period being selected to avoid making a determination of pedal position when the pedal is in a abnormal "snap-back" position.

In a particular embodiment of the invention, an initial signal value representative of an initial foot-off position of the accelerator pedal upon vehicle engine power-up is stored and compared to the current foot-off pedal position value. If an abnormal pedal position is indicated, then the comparison of the current foot-off pedal position value and the average of the previously stored pedal position values is made.

In another particular embodiment of the invention, the current pedal position value is determined as a rolling average of sensed pedal position values over a time period.

The present invention provides pursuant to another embodiment a method and system for determining a foot-off accelerator pedal position embodying features described above.

The present invention is advantageous to improve determination of the foot-off accelerator pedal position and thus the closed throttle valve position during vehicle operation by reducing or avoiding sensing of abnormal pedal positions resulting from temporary "snap-back" or "pull-back" accelerator pedal events. The present invention thereby improves of control of the throttle valve which in turn controls airflow to the internal combustion engine.

The above advantages of the present invention will become more readily apparent from the following description taken with the following drawings.

DETAILED DESCRIPTION OF THE PREFERRED EMBODIMENT

Figure 1:
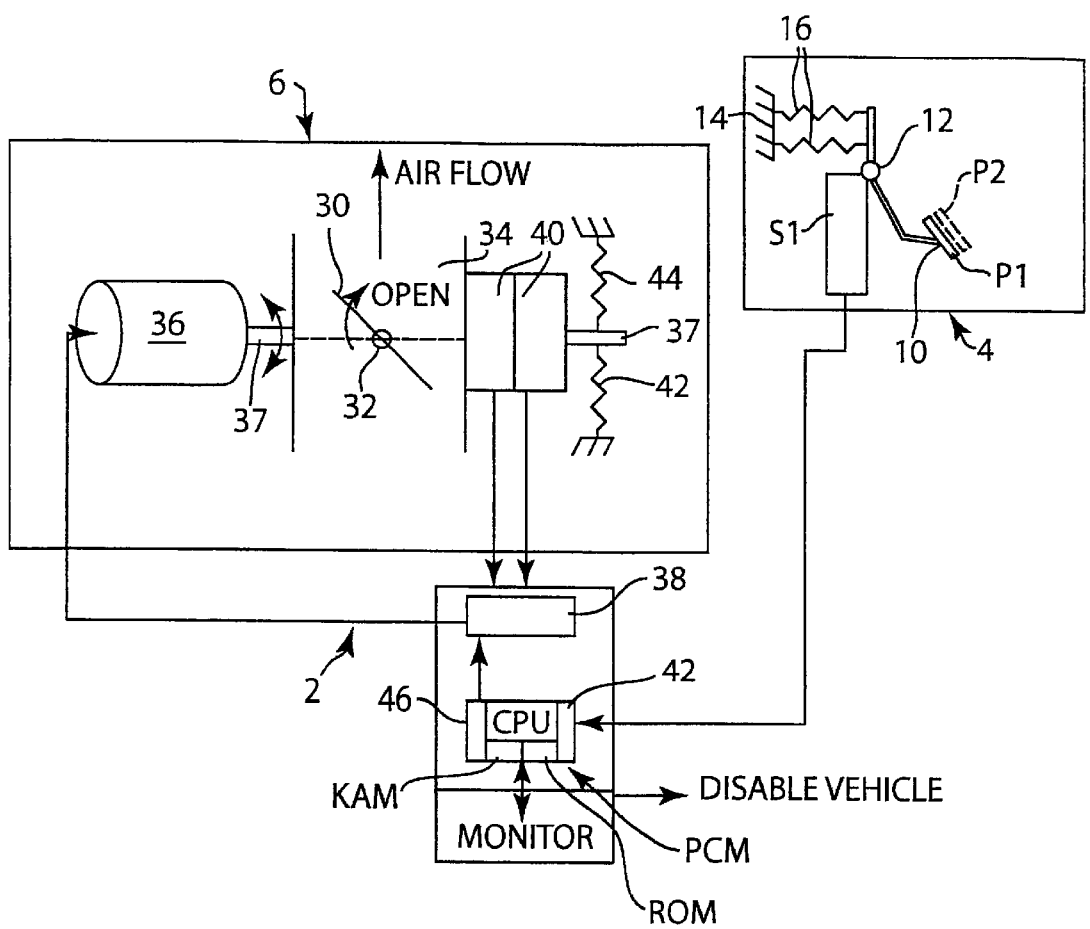
FIG. 1 is a schematic view of an illustrative throttle valve control system to which the invention is applicable.

Referring to FIG. 1, a throttle control system 2 of a motor vehicle is shown for purposes of illustration and not limitation as including an accelerator pedal assembly 4 and an electronic throttle body assembly 6 wherein the accelerator pedal is not directly linked mechanically to the throttle valve. The accelerator pedal assembly 4 includes accelerator pedal 10 which is pivotally mounted on a pivot mechanism with the addition of a friction element 12 (for improved pedal feel) on a vehicle floor panel 14. Pedal return springs 16 are placed between the accelerator pedal 10 and the panel 14 in a manner to urge the accelerator pedal in a direction toward a closed, foot-off (released) pedal position P1 assumed by the pedal when the driver removes his/her foot from the pedal 10 and corresponding to a closed throttle valve condition. An accelerator pedal position sensor S1 generates analog signals corresponding to the movement of the pedal 10 toward or away from the floor panel 14 as a result of the driver's depressing the pedal or releasing it by removing his foot from the pedal. The analog signals from the one or more pedal position sensors are provided to a Powertrain Control Module PCM. The pedal sensor S1 typically includes a potentiometer connected between a voltage source and ground in conventional manner, although other types of pedal position sensors can be used in practice of the invention. The wiper arm of the potentiometer is connected to the pedal 10 in a manner that movement of the wiper arm changes the resistance value of the potentiometer as the pedal 10 moves between the foot-off (released) position P1 and a fully depressed position (not shown) to provide a relatively low voltage signal (value) at the foot-off pedal position and a relatively higher voltage signal (value) at the fully depressed position. The invention is not so limited as it can be practiced using one or more pedal position sensors whose signal (voltage) output decreases, rather than increases, as the accelerator pedal is moved from the foot-off pedal position toward the fully depressed position. Combinations of such pedal position sensors can be used as well in practice of the invention wherein their signals can be converted as necessary to provide usable signals to the PCM.

Electronic throttle body assembly 6 includes a variable positionable throttle valve 30 mounted for rotation with a throttle shaft 32 within an air induction passage 34 for controlling airflow to an internal combustion engine (not shown). A bi-directional motor 36 such as for example a DC or stepper motor has a motor shaft 37 which is drivingly connected to the throttle shaft 32 such that the motor 36 can vary the rotary position of the throttle valve 30 in the air induction passage 34 to vary the airflow to the internal combustion engine in conventional manner. The motor 36 is electrically controlled by a drive circuit 38 of the PCM. One or more (two shown) throttle valve position sensors 40 are provided for generating analog signals corresponding to the degree of opening of the throttle valve. The sensors 40 may comprise a potentiometer having a wiper arm operatively connected to a rotary output shaft 37 of the control motor 36 to change the resistance value of the potentiometer as the control motor shaft is rotated to move the throttle shaft 32. The motor shaft 37 is biased in a return direction by a throttle valve return spring 42 and to a limp home throttle position by a limp home spring 44 when the vehicle is disabled. A separate electronic throttle monitor CPU in the PCM has the ability to independently limit engine power if the throttle position is greater than expected for a given driver pedal position input. This feature adds control redundancy for the electronic throttle control system.

The throttle control system 2 functions to determine the required position of the throttle valve 30 at a given time of engine operation. The system 2 calculates the driver demand by taking the difference between the current position of accelerator pedal 10 and an adaptively learned closed accelerator pedal position corresponding to a closed throttle valve 30 (corresponding to engine idling condition). The actual setting of the position of the throttle valve 30 is achieved using the control motor 36 and drive circuit 38. The control system produces a control signal to the drive circuit 38 for controlling the direction and degree of motion of the bi-directional motor 36. The control system 2 determines values for the position of the pedal 10 and determines a demand value for the setting of the throttle valve 30 to achieve the power demanded by the driver.

The Powertrain Control Module PCM includes a digital microprocessor CPU, an analog-to-digital converter 42, a keep alive memory KAM, a read only memory ROM, a timer (not shown), and motor position controller 46. The analog-to-digital converter 42 receives the analog signals from a pedal position sensor S1 and throttle valve position sensors 40 and converts the signals to corresponding digital signals for use by the CPU and storing in KAM. The CPU includes a memory containing the programmed logic instructions for operating the CPU for making determinations using the pedal position data and throttle valve position data stored in KAM. The motor position controller 46 converts the instruction information from the CPU into analog form and applies control signals to the drive circuit 38 for controlling the direction and degree of motion of the shaft 37 of motor 36 and thus the throttle valve 30.

More than one pedal sensor can be used in practicing the invention. For example, two or three redundant pedal position sensors similar to sensor S1 can be used in practice of the invention. The control logic described below will be executed for each pedal position sensor as described below. If all pedal position sensors are within range, then the logic control will use a first designated pedal position sensor. If that pedal position sensor is out of range, then the control logic will execute on the next within-range pedal position sensor to determine the closed pedal position.

Figure 2:
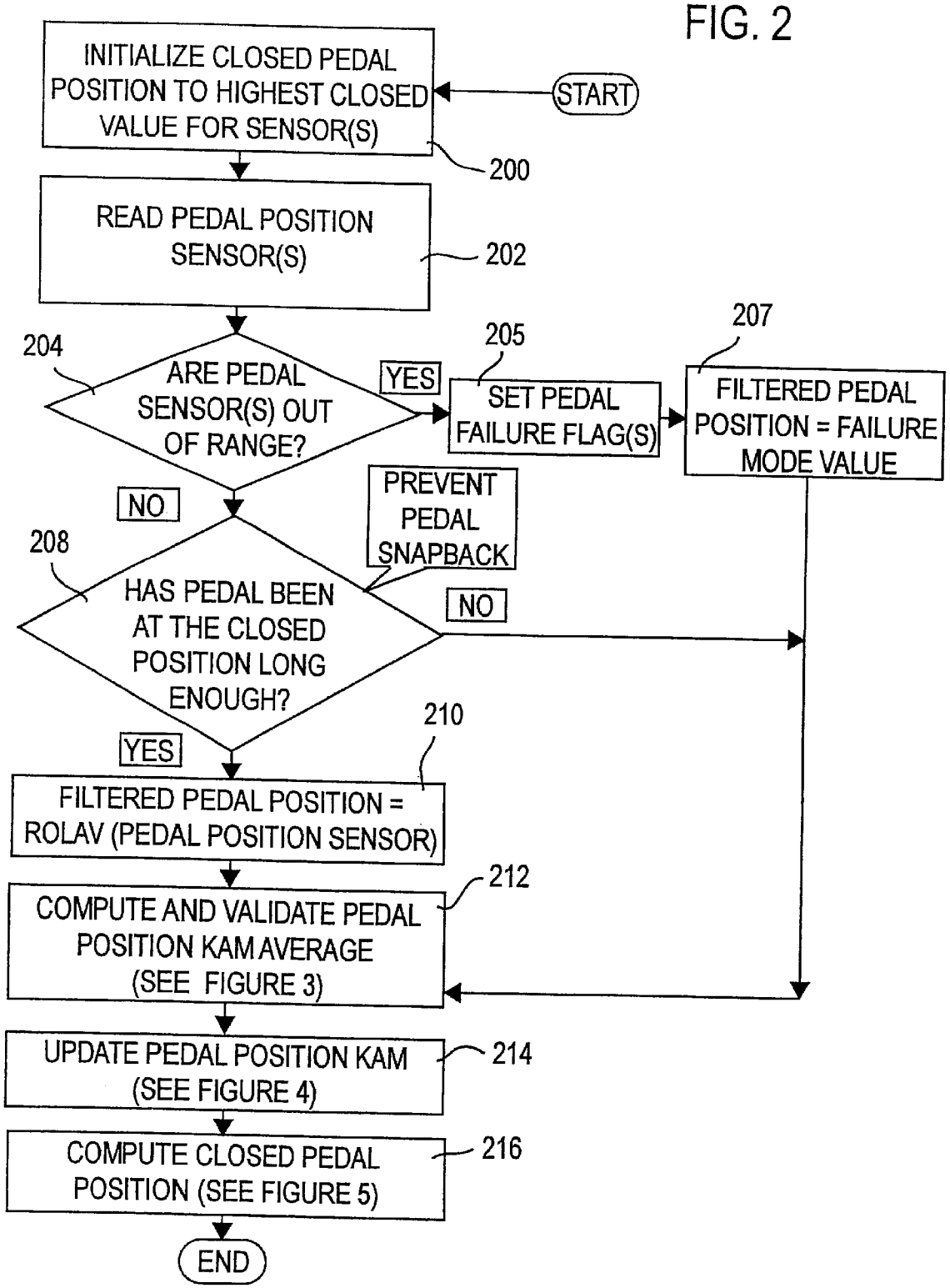
FIG. 2 is flow diagram of one method embodiment according to the invention to determine a closed throttle valve position.

FIG. 2 is flow diagram of an illustrative embodiment of the invention offered for determining a closed throttle valve position for use by throttle control system 2 to control throttle valve 30. The program logic flow is started at power up of the internal combustion engine and is entered at step 200 which involves initializing the closed foot-off accelerator pedal position at engine power-up to a value stored in ROM, that represents the highest possible closed pedal position based on manufacturer's specification of the pedal assembly. The initializing step provides a starting point for the closed pedal position determination logic. The initialized value of the closed foot-off accelerator pedal position at each engine power-up is within a normal range of pedal positions based on the manufacturer's specification of the pedal assembly and will not change significantly from one engine power-up to the next.

The logic flow then proceeds to step 202 where the pedal position sensor S1 is read to obtain a voltage value and then to step 204 where there is made a determination as to whether the pedal position sensor S1 is out of a predetermined voltage range. If yes, a pedal sensor failure flag is set in step 205 and then in step 207 the filtered pedal position is set equal to a value stored in ROM, that represents the highest possible closed pedal position based on manufacturer's specification of the pedal assembly for that sensor. If the pedal position sensor S1 is determined to be within the predetermined range, then the logic flow proceeds to step 208 where there is a determination as to whether the pedal 10 has been at the closed foot-off position long enough to avoid an abnormal pedal "snap-back" position illustrated as P2. Step 208 thereby avoids making a determination of pedal position until after a time period (e.g. one second) long enough to avoid sensing the abnormal temporary "snap-back" pedal position as the closed pedal position.

If the pedal 10 has been at the closed foot-off position long enough, the logic flow proceeds to step 210 where a filtered pedal position value is determined as a rolling average of a plurality voltage values from pedal position sensor S1 over an initial time period. For example, a typical rolling average comprises the average of 125 sensed voltage values from the pedal position sensors.

Figure 3:
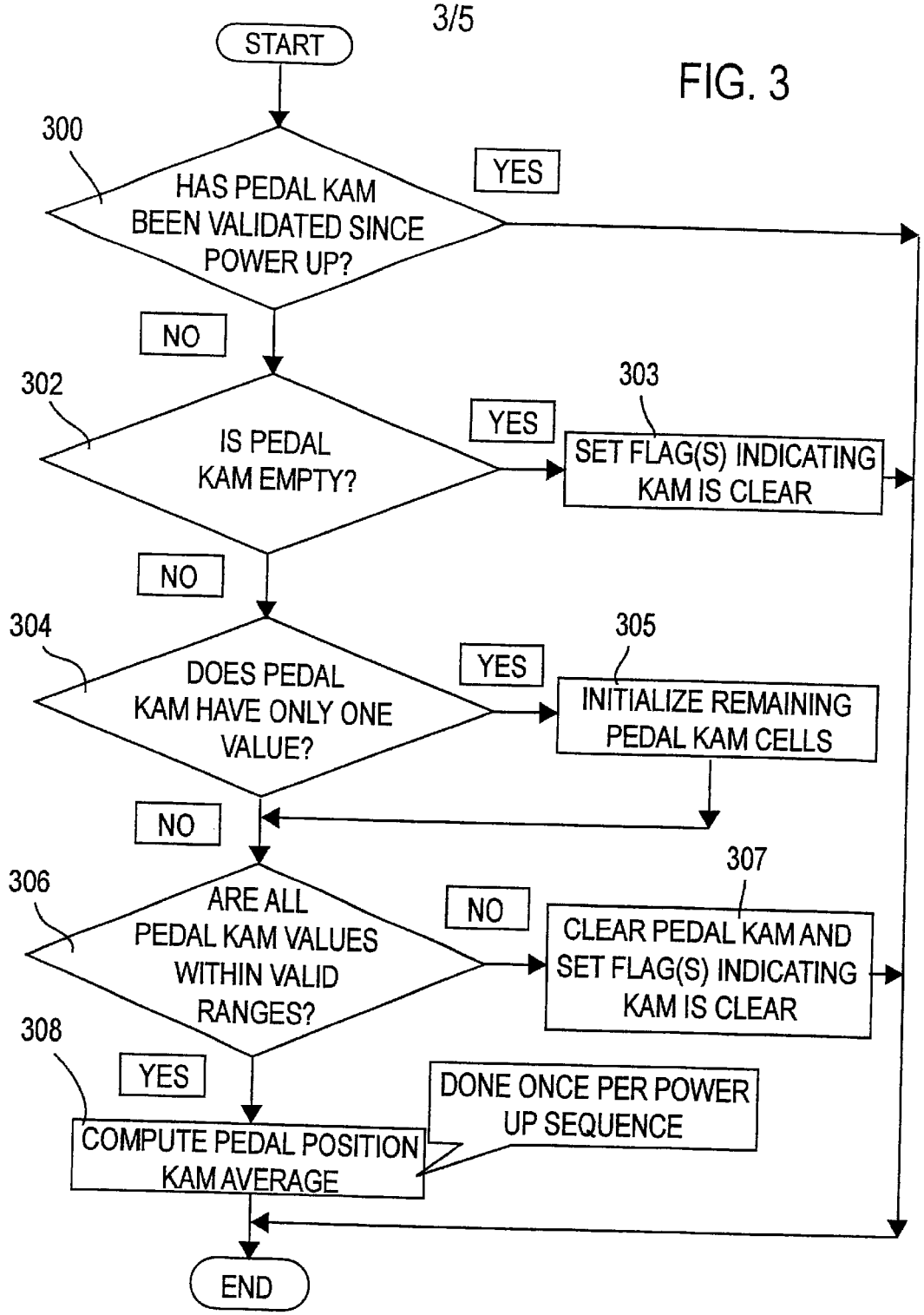
FIG. 3 is flow diagram illustrating determination of the average of the previously stored accelerator pedal positions.

The logic flow proceeds to step 212 where an average value of the previous accelerator pedal positions stored in KAM is computed and validated. Step 212 is conducted once per power up of the internal combustion engine in the manner illustrated in FIG. 3 where step 300 determines whether KAM has been validated since power-up where validation is defined in steps 302 to 308. If yes, then the logic flow of FIG. 3 is exited. If no, the logic flow proceeds to step 302 where a determination is made as to whether the KAM is empty of stored values of previous pedal positions. If yes, a flag is set in step 303 in logic indicating that the KAM is clear or empty, the logic flow of FIG. 3 is exited. If the KAM is not empty, then step 304 determines whether KAM has only one value of a previously stored pedal position. If yes, then the logic flow proceeds to step 305 where remaining KAM cells are initialized with the one value previously stored (prior to power up) in KAM. For purposes of illustration and not limitation, six previous pedal position values are stored in KAM at any given time. If no, step 306 determines whether all stored values of pedal position in KAM are within a predetermined valid range. The range of values is stored in ROM and represents the highest and lowest possible closed pedal positions based on the manufacturer's specification of the pedal assembly. If not, the KAM is cleared, and a flag is set indicating that the KAM is clear followed in step 307 by exiting the logic flow of FIG. 3. If yes, step 308 calculates an average value of the previous accelerator pedal position voltage values stored in KAM.

Figure 4:
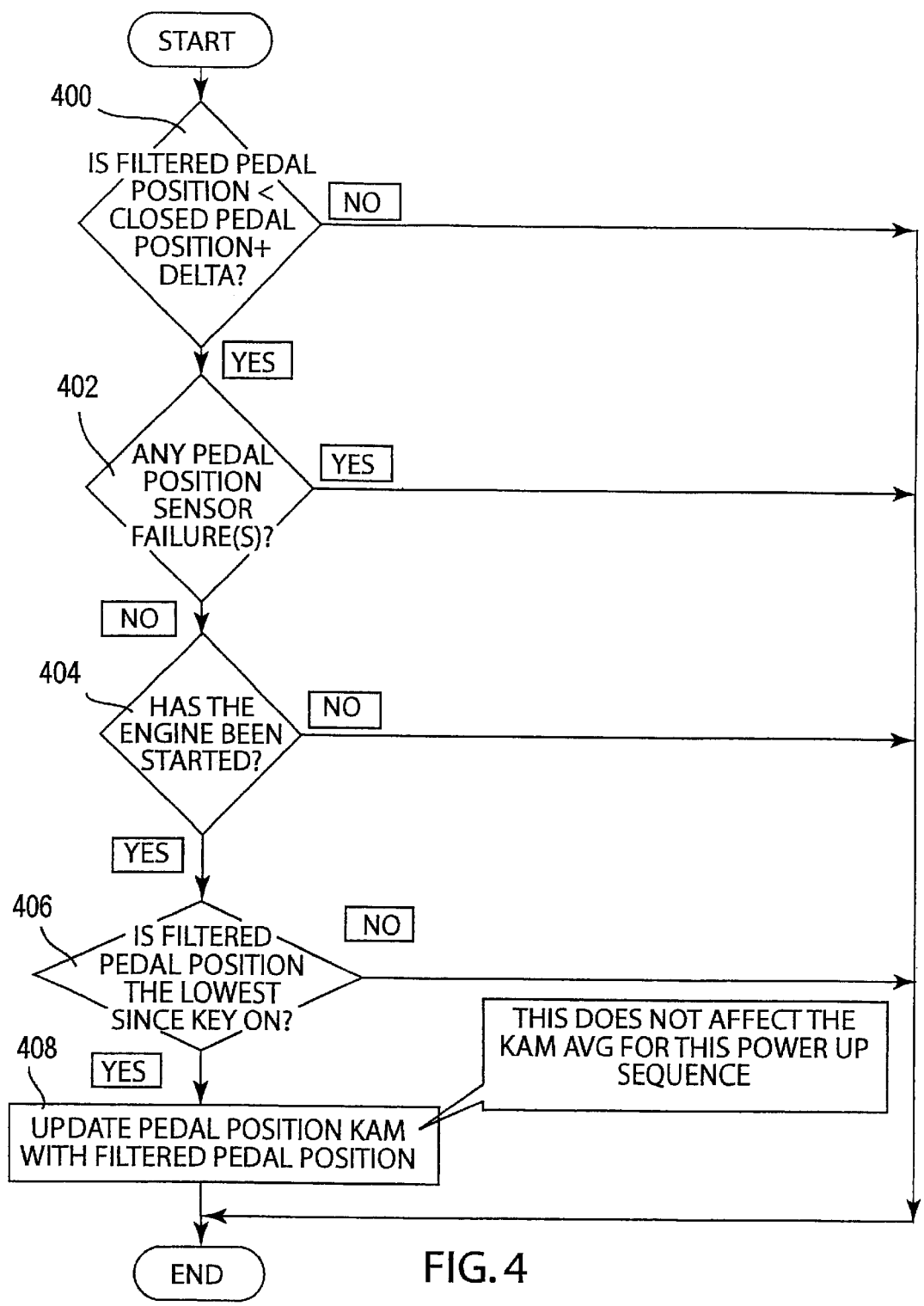
FIG. 4 is flow diagram illustrating updating of the accelerator pedal position in memory.

Logic flow proceeds from step 212 to step 214 where the filtered pedal position value from step 210, or step 207 in the event of failure of pedal sensor S1, is evaluated to determine if it is the lowest pedal position value since engine power-up. KAM will be updated if the filtered pedal position value is the lowest since power-up. Step 214 is conducted every time the pedal sensor is read. The details of step 214 are illustrated in FIG. 4. Step 400 determines whether the filtered pedal position value from step 210, or step 207 in the event of pedal sensor failure, is close enough to the closed pedal position value, initialized in step 200 and evaluated/calculated in step 216, requires further evaluation before it can be written to KAM. If no, then the logic flow of FIG. 4 is exited. If yes, the logic flow proceeds to step 402 where a determination is made as to whether there is a pedal sensor failure. If yes, the logic flow of FIG. 4 is exited. If no, the logic flow proceeds to step 404 where a determination is made as to whether the internal combustion engine has been started. If no, then the logic flow of FIG. 4 is exited. If yes, the step 406 determines whether the filtered pedal position value is the lowest such value since the vehicle ignition key was turned on. If no, then the logic flow of FIG. 4 is exited. If yes, the logic flow goes to step 408 where the KAM is updated to store the most recent filtered pedal position value for this power-up. This updated pedal position value represents a pedal position within the normal range of pedal positions and is used in calculation of the KAM average value for the next following power-up but not the current power-up condition.

Figure 5:
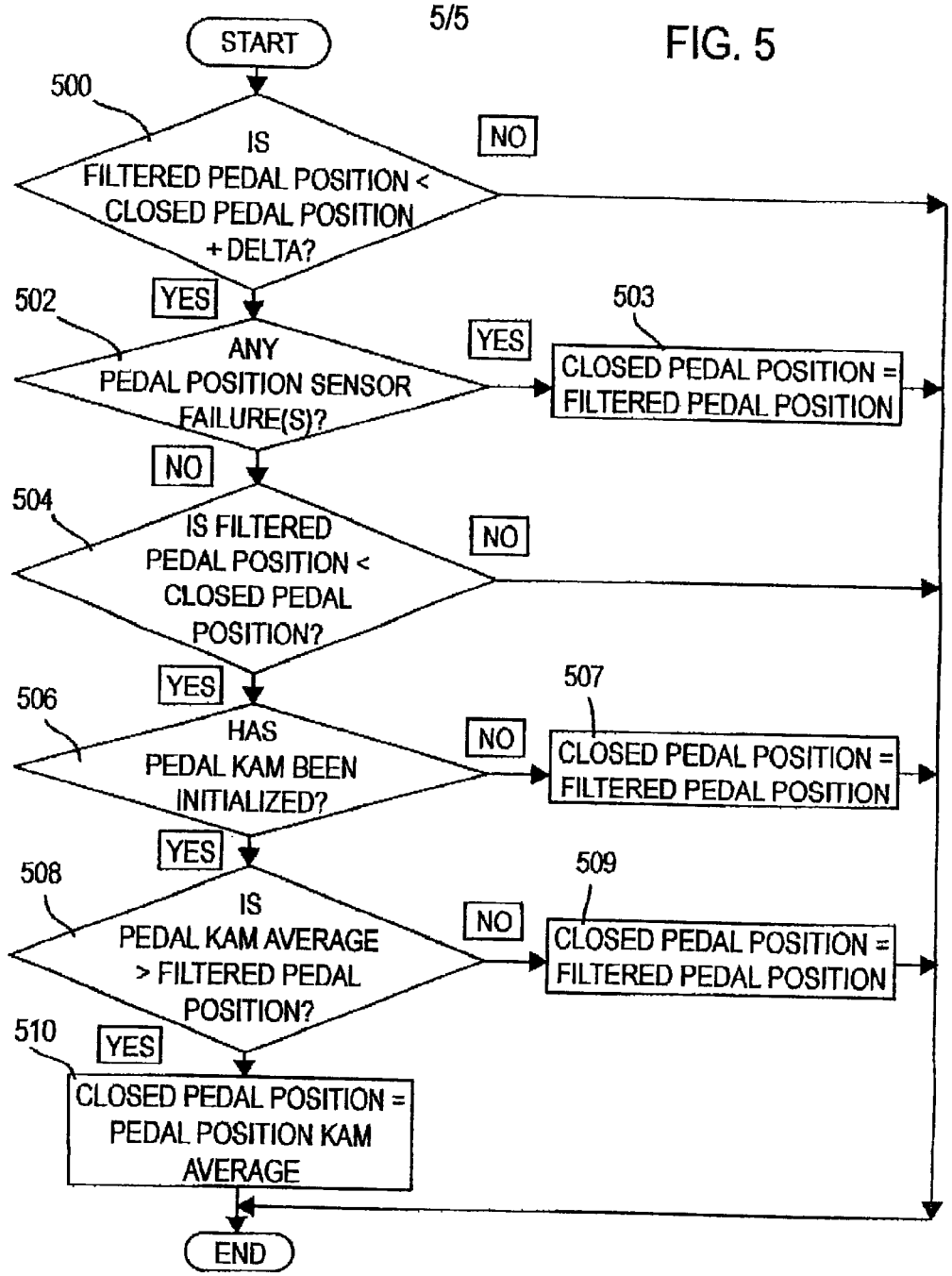
FIG. 5 is flow diagram illustrating determination of the closed pedal position by comparing the average of previously stored pedal positions and the filtered pedal position.

Logic flow of FIG. 2 proceeds from step 214 to step 216 where the closed pedal position value is calculated as illustrated in FIG. 5. Step 216 is conducted every time the pedal sensor S1 is read. Step 500 determines whether the filtered pedal position value from step 210, or step 207 in the event of failure of pedal sensor S1, is close enough to the closed pedal position, initialized in step 200 and evaluated/calculated in step 216, making it a candidate to be used as the new closed pedal position. If no, then the logic flow of FIG. 5 is exited. If yes, the logic flow proceeds to step 502 where a determination is made as to whether there is a pedal sensor failure. If yes, the closed pedal position is set equal to the filtered pedal position in step 503 and the logic flow of FIG. 5 is exited. If no, the logic flow proceeds to step 504 where a determination is made as to whether the filtered pedal position value from step 210, or step 207 in the event of failure of pedal sensor S1, is less than the closed pedal position value, initialized in step 200 and evaluated/calculated in step 216, making it a candidate to be used as the new closed pedal position. If no, then the logic flow of FIG. 5 is exited. If yes, the step 506 determines whether the KAM has been initialized with stored pedal position values. If no, then step 507 sets the closed pedal position value as equal to the filtered pedal position value and proceeds to exit the logic flow of FIG. 5. If yes, the logic flow goes to step 508 where the average of the previously stored pedal position values stored in KAM and calculated in step 212, is compared to the filtered pedal position value. If the filtered pedal position value is greater than the KAM average value, step 509 sets the closed pedal position value as equal to the filtered pedal position value and proceeds to exit the logic flow of FIG. 5. If the filtered pedal position value is less than the KAM average value indicative of an abnormal pedal position, the logic flow proceeds to step 510 which sets the closed pedal position value as equal to the average of the previously stored pedal position values calculated in step 508. Step 510 thereby avoids making a throttle position determination based on an abnormal "pull-back" pedal position also illustrated in FIG. 1 as P2 that is outside the normal pedal position range.

The closed pedal position value of step 509 or step 510 (which is set equal to the KAM average value) or 509, is used to determine throttle position.

The invention is advantageous to improve determination of the closed foot-off pedal position and thus the closed throttle valve position during vehicle operation by avoiding effects of a temporary abnormal "snap-back" pedal position by use of step 208 of FIG. 2 and avoiding effects of an abnormal "pull-back" accelerator pedal position by use of steps 212 to 216 together with steps 506–510 of FIG. 5. The present invention improves of control of the throttle valve which in turn controls airflow to the internal combustion engine.

While the invention has been described in terms of specific embodiments thereof, it is not intended to be limited thereto but rather only as set forth in the appended claims.

What is claimed is:

1. A method of determining a closed throttle position of a vehicle internal combustion engine using a signal value representative of a foot-off position of an accelerator pedal, comprising storing a plurality of signal values representative of previous foot-off positions of said accelerator pedal, determining an average of said plurality of said signal values determining a current foot-off position value of said accelerator pedal, comparing said current foot-off pedal position value to said average, and using said average to determine a closed throttle position when said comparing is indicative of an abnormal pedal position.

2. The method of claim 1 wherein said current foot-off pedal position value is determined after a predetermined period of time since said accelerator pedal has moved to the foot-off pedal position.

3. The method of claim 1 wherein said current pedal position value is determined as a rolling average of sensed pedal position values over a time period.

4. The method of claim 1 including the steps of first storing an initial signal value representative of initial foot-off position of the accelerator pedal upon engine power-up, comparing said current foot-off pedal position value to said initial value, and if an abnormal pedal position is indicated, proceeding to said comparing said current foot-off pedal position value to said average.

5. The method of claim 1 wherein the abnormal pedal position includes a pull-back pedal position.

6. A method of determining a foot-off position of a vehicle accelerator pedal, comprising storing a plurality of signal values representative of previous foot-off positions of said accelerator pedal, determining an average of said plurality of said signal values, determining a current foot-off position value of said accelerator pedal, comparing said current foot-off pedal position value to said average, and using said average as representative of the foot-off pedal position when said comparing is indicative of an abnormal pedal position.

7. The method of claim 6 wherein said current foot-off pedal position value is determined after a predetermined period of time since said accelerator pedal has moved to the foot-off pedal position.

8. The method of claim 6 wherein said current pedal position value is determined as a rolling average of sensed pedal position values over a time period.

9. The method of claim 6 including the steps of first storing an initial signal value representative of initial foot-off position of the accelerator pedal upon engine power-up, comparing said current foot-off pedal position value to said initial value, and if an abnormal pedal position is indicated, proceeding to said comparing said current foot-off pedal position value to said average.

10. The method of claim 6 wherein the abnormal pedal position includes a pull-back pedal position.

11. A throttle control system for a vehicle internal combustion engine, comprising a sensing device for sensing a foot-off position of an accelerator pedal and providing a signal value representative of the foot-off position, and a controller for storing a plurality of signal values representative of previous foot-off positions of said accelerator pedal, determining an average of said plurality of said signal values, determining a current foot-off position value of said accelerator pedal, comparing said current foot-off pedal position value to said average, and using said average to determine a closed throttle position when said comparing is indicative of an abnormal pedal position.

12. The system of claim 11 wherein said controller determines said current foot-off pedal position value after a predetermined period of time since said accelerator pedal has moved to the foot-off pedal position.

13. The system of claim 11 wherein said controller determines said current pedal position value as a rolling average of sensed pedal position values over a time period.

14. The system of claim 11 wherein said controller first stores an initial signal value representative of initial foot-off position of the accelerator pedal upon engine power-up, compares said current foot-off pedal position value to said initial value, and if an abnormal pedal position is indicated, proceeds to said comparing said current foot-off pedal position value to said average.

15. A vehicle accelerator pedal system, comprising a sensing device for sensing a foot-off position of an accelerator pedal and providing a signal value representative of the foot-off position, and a controller for storing a plurality of signal values representative of previous foot-off positions of said accelerator pedal, determining an average of said plurality of said signal values, determining a current foot-off position value of said accelerator pedal, comparing said current foot-off pedal position value to said average, and using said average as representative of the foot-off pedal position when said comparing is indicative of an abnormal pedal position.

16. The system of claim 15 wherein said controller determines said current foot-off pedal position value after a predetermined period of time since said accelerator pedal has moved to the foot-off pedal position.

17. The system of claim 15 wherein said controller determines said current pedal position value as a rolling average of sensed pedal position values over a time period.

18. The system of claim 15 wherein said controller first stores an initial signal value representative of initial foot-off position of the accelerator pedal upon engine power-up, compares said current foot-off pedal position value to said initial value, and if an abnormal pedal position is indicated, proceeds to said comparing said current foot-off pedal position value to said average.

19. In a method of determining a closed throttle position of a vehicle internal combustion engine using a signal value representative of a foot-off position of an accelerator pedal, the step of determining a current foot-off position value of said accelerator pedal after a predetermined period of time since said accelerator pedal has moved to the foot-off pedal position to avoid making a pedal position determination when an abnormal pedal position is temporarily present.

20. The method of claim 19 wherein said predetermined period is selected to avoid making a determination of current pedal position when the pedal is in a snap-back position.

21. A throttle control system for a vehicle internal combustion engine, comprising a sensing device for sensing a foot-off position of an accelerator pedal and providing a signal value representative of the foot-off position, and a controller for determining a current foot-off position value of said accelerator pedal after a predetermined period of time since said accelerator pedal has moved to the foot-off pedal position to avoid making a pedal position determination when an abnormal pedal position is temporarily present.

22. The system of claim 21 wherein said predetermined period is selected to avoid making a determination of current pedal position when the pedal is in a snap-back position.

* * * * *